United States Patent [19]

Rossitto et al.

[11] Patent Number: 4,788,091

[45] Date of Patent: Nov. 29, 1988

[54] FLAME RETARDANT EMBOSSING FILM

[75] Inventors: Conrad Rossitto, Andover; Leon Pechinski, Danvers, both of Mass.

[73] Assignee: Emhart Enterprises Corp., Farmington, Conn.

[21] Appl. No.: 86,326

[22] Filed: Aug. 17, 1987

[51] Int. Cl.[4] .......................... C08K 5/04; C08K 3/22
[52] U.S. Cl. ................................. 428/40; 427/208.2; 428/425.1; 523/456; 523/460
[58] Field of Search ............... 523/456, 460; 524/412, 524/409; 525/930, 457; 427/208.2, 386; 156/306.9; 428/40

[56] References Cited

U.S. PATENT DOCUMENTS

| | | | |
|---|---|---|---|
| 3,321,549 | 5/1967 | Barth | 525/930 |
| 3,715,310 | 2/1973 | Butcher | 252/8.1 |
| 3,770,555 | 11/1973 | Gladstone et al. | 156/306.9 |
| 3,960,799 | 6/1976 | Mosimann et al. | 525/930 |
| 3,971,752 | 7/1976 | Aoyama et al. | 524/412 |
| 4,284,682 | 8/1981 | Frosch et al. | 524/412 |
| 4,287,309 | 9/1981 | Cobbledick | 521/121 |
| 4,397,974 | 8/1983 | Goyert et al. | 524/143 |

OTHER PUBLICATIONS

Federal Register, vol. 51, No. 139, Monday, Jul. 21, 1986, pp. 26206–26221.

Primary Examiner—Lewis T. Jacobs
Attorney, Agent, or Firm—Thomas S. Szatkowski

[57] ABSTRACT

A flame retardant, curing adhesive film having improved OSU heat release properties is provided. The film contains decabromophenylene oxide and antimony trioxide as a flame retardant agent.

13 Claims, No Drawings

FLAME RETARDANT EMBOSSING FILM

BACKGROUND OF THE INVENTION

1. Field of the Invention

The invention relates to a flame retardant, curing adhesive film which is used to produce materials for aircraft interiors.

2. Description of the Prior Art

Materials used for interiors of commercial aircraft have typically been produced by embossing a curing adhesive film with a polyvinylflouride film, such as that sold under the trademark Tedlar by E. I. DuPont de Nemours & Company, Wilmington, Del. The purpose of the the curing adhesive film is to preserve the texture imparted to the Tedlar by the embossing or thermoforming operation and to provide flame retardant properties.

Flame retardant properties are quite important for material used in the interior of commercial aircraft and for some time the Federal Aviation Administration (FAA) has required that such materials pass a vertical burn test. Recently, in an attempt to improve the flammability standards for materials used in the interiors of commercial aircraft, the FAA has established a new test method which measures heat release rate from materials exposed to radiant heat. Details of the new test method are found in the Federal Register, Vol. 51, No. 139, Monday, July 21, 1986, pp. 26206-221. Generally, the method uses the heat release apparatus developed at the Ohio State University (OSU) and standardized by the American Society of Testing Materials (ASTM), ASTM-E-906. The apparatus measures the total heat release of the material tested in kilowatt minutes per square meter over the first two minutes, and also peak heat release in kilowatts per square meter. Under the new FAA standards, materials used in commercial aircraft cabin interiors must exhibit a total heat release over the first two minutes of less than 65 kilowatt minutes per square meter and a peak heat release of less then 65 kilowatts per square meter.

Prior art curing adhesive films which possessed suitable embossing retention characteristics and which passed the vertical burn test contained an organic binder component and approximately 40 to 80 weight percent of a fire retardant agent. The organic binder component of the prior art films included a hydroxyl terminated thermoplastic polyurethane elastomer, a phenoxy resin and a blocked aliphatic isocyanate prepolymer. The fire retardant agent of the prior art films included aluminum oxide trihydrate and antimony trioxide at a ratio of approximately 2.5:1.

When formed into a film at a typical thickness of 0.003" mils, these prior art films pass the vertical burn test. They do not, however, exhibit adequate heat release properties as measured by the new OSU heat release test.

It is an object of the present invention to provide a curing adhesive film which possesses the requisite flexibility and embossing retention characteristics and which possess excellent heat release properties by having a total heat release rate significantly less than 65 kilowatt minutes per square meter and a peak heat release rate of significantly less than 65 kilowatts per square meter.

SUMMARY OF THE INVENTION

It has now been found that a curing adhesive film possessing excellent flexibility, embossing retention characteristics and exceptional heat release properties comprises:

(a) an organic binder portion comprising: a hydroxyl terminated thermoplastic polyurethane elastomer, a phenoxy resin, and a blocked aliphatic isocyanate prepolymer; and (b) from about 50 to about 85 percent by weight of the total film composition of a fire retardant agent comprising: decabromophenylene oxide and antimony trioxide in a ratio of from about 3:2 to about 1:2.

The novel curing adhesive films in accordance with the present invention have exceptional OSU heat release properties, with total heat release over the first two minutes of from about 20 to about 40 kilowatt minutes per square meter and with a peak of from about 25 to about 40 kilowatt minutes per square meter.

DESCRIPTION OF THE PREFERRED EMBODIMENT

The hydroxyl terminated thermoplastic polyurethane elastomers which are utilized to produce the curing film adhesives according to the present invention must be compatible with phenoxy resins, soluable in solvents such as methyl ethyl keytone (MEK), toluene, or glycol ethers, and have a hydroxyl number of about 1 to about 8 mg KOH/g. Preferred thermoplastic polyurethane elastomers are the reaction products of butane diol adipate, hexane diol adipate or polycaprolactone chain extended with methylene bis diphenyl diisocyanate (MDI) or butane diol. These include products such as KJ Quinn PA-58 sold by K. J. Quinn, Melrose, Mass., Morton CA-101 or CA-100, sold by Morton Chemical, Chicago, Ill., and S943-34 sold by Bostik Industrial Products Division, Middleton, Mass. Particularly preferred are the reaction product of polycaprolactone and MDI in stoichiometric proportions to produce a polyurethane having a hydroxyl number of from about 1 to about 8 mg KOH/g. This reaction is generally carried out at 40% solids in a solvent such as toluene at about 100° C. The reaction is terminated when no NCO peaks are present, as determined by the infrared method.

The phenoxy resins which are utilized to produce the curing film adhesives according to the present invention are hard, solid polymers made by reacting bisphenol A and epychlorohydrin and having the following structure:

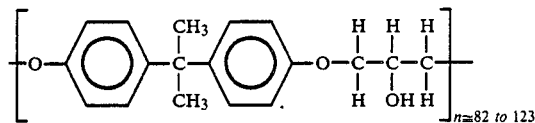

These products are available from Union Carbide under the names Phenoxy PKHA, PKHH and PKHJ. All have been found to be acceptable but PKHJ is particularly preferred. Phenoxy PKHJ is the highest molecular weight member of the phenoxy resin family and is available with molecular weights ranging from about 25,000 to about 35,000; and a Melt Index of about 3.5 to about 6.5. Phenoxy PKHJ is particularly preferred because it produces the toughest, easiest to handle film in the uncrosslinked state.

The blocked aliphatic isocyanate prepolymers which are utilized to produce the curing film adhesives according to the present invention include both difunctional and trifunctional isocyanates. Under embossing conditions, the blocked isocyanate prepolymers crosslink with both the phenoxy and polyurethane components to provide the requisite embossing retention characteristics and the requisite adhesion to Tedlar. Suitable blocked aliphatic isocyanate prepolymers include Mobay LS-2800 (also known as Desmodur BL-3175), Mondur SH and Mondur S, sold by Mobay Chemical, Pittsburgh, Pa.

Mobay LS-2800 is a trifunctional ketoxime blocked hexane diisocyanate trimer of the structure:

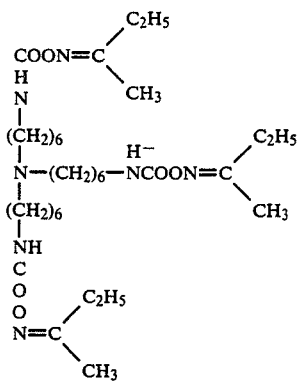

Mondur SH is a trifunctional phenol blocked TDI adduct of trimethylol propane. Mondur S is a phenol blocked TDI. Of these, the trifunctional blocked aliphatic isocyanate prepolymers are preferred because they result in a stiffer and better crosslinked film. Particularly preferred is Mobay LS-2800.

While other blocked isocyanate prepolymers can be used as the crosslinking agent; however, the aliphatic isocyanates are preferred due to their light stability. The blocking agent may be any suitable blocking agent. A ketoxime blocking agent is preferred over phenol because ketoxime imparts less color to the cured adhesive embossing film and hence to light colored Tedlar. In some instances discoloration has been encountered when phenol has been used as the blocking agent. Preferred ketoximes include dimethyl ketoxime, methyl ethyl ketoxime, methyl isobutyl ketoxime, benzophenone oxime, cyclohexanone oxime or acetophenone oxime.

The preferred antimony trioxide utilized to produce films according the present invention should have an average particle size of less than approximately 10 microns so that it will form a dispersion in a suitable solvent such as Toluene, MEK or any of the glycol ethers. Suitable antimony trioxides include Amspec KR, having an average particle size of 1.1 micron and sold by Amspec Chemical Co.; and Thermoguard S, having an average particle size of 1.5 micron, sold by Metal & Thermit (M & T). Preferred is Thermoguard S.

The decbromophenylene oxide utilized to produce films according to the present invention should have an average particle size of less than approximately 10 microns so that it will form a dispersion in a suitable solvent such as Toluene, MEK or any of the glycol ethers. Suitable decabromophenylene oxides include DE83R from Great Lakes Chemical, having an average particle size of approximately 5 microns, and more than 90% of the particles having a particle size less than 10 microns and Saytec 102 from Ethyl Corp. Preferred in DE83R.

The curing film adhesives according to the present invention are produced by forming a solution of the thermoplastic polyurethane elastomer and the phenoxy resin in a suitable solvent. Solvents include MEK, Toluene and glycol ethers such as methoxy acetoxy propane, sold under the tradename Dowanol PM by Dow Chemical, Midland, Mich. Solutions are formed with approximately 25 to 50% solids by weight and having a solution viscosity of approximately 2000 to 7000 CPS.

The blocked aliphatic isocyanate component may be added directly to the polyurethane/phenoxy solution; however, it is preferred that the isocyanate component be added just prior to casting the final mixture into film.

The phenoxy resin and polyurethane elastomer are employed in a weight ratio of phenoxy/polyurethane of about 1:3 to about 2:1, with a range of about 1.5:1 to about 2:1 being preferred. Ratios outside of 1:3 to 2:1 result in films which lack flexibility, i.e., are too brittle, and thus not suitable for embossing. Changing the ratio of phenoxy/polyurethane within the above ranges will produce films of different flexibility, but still within the criteria for suitable embossing films. Generally, increasing the amount of phenoxy resin results in the production of a more rigid film. Increasing the amount of polyurethane results in the production of a softer film.

A dispersion of the flame retardant agents in a suitable solvent is produced separately from the polyurethane/phenoxy solution. Suitable solvents for the flame retardant include Toluene, MEK and glycol ethers such as methoxy acetoxy propane sold under the tradename Dowenol PM. The dispersion is formed with approximately 40 to 70% solids. The decambromophenylene oxide and antimony trioxide are employed in a ratio of decabromophenylene oxide to antimony trioxide of from about 3:2 to about 1:2 with a ratio of about 3:1 being preferred. Other flame retardant agents such as aluminum oxide trihydrate may also be used in addition to the decabromophenylene oxide and antimony trioxide as long as the above ratio of decabromophenylene oxide to antimony trioxide is maintained.

After the solution of organic binder and dispersion of flame retardants have been formed, they should be mixed together in the amounts to form a final film composition of about 50 to about 85 weight percent flame retardant. The preferred film composition has from about 60 to about 75 weight percent flame retardant agent.

The combined solutions are mixed well to produce a solution with approximately 40 to 50% solids and a viscosity of about 3000 to about 6000 CPS. The blocked aliphatic isocyanate prepolymer is added to this combined solution in an amount to result in approximately 2 to 7 weight percent of the final film composition with about 2½ to 6% preferred. Other additives such as surfactants may be added in suitable amounts to improve the smoothness of the film.

The combined solution with the additional additives, if any, is cast on release paper using suitable coating equipment. The typical thickness is about 0.003" mils. The wet film coating is then dried continuously in an oven at temperatures less than 200° F. for about 10 to 20 minutes in order to remove volatile solvents. Care must be taken to dry the film at the lowest temperature possible and for the shortest time to prevent unblocking of the blocked isocyanate component. In this form, the film is in the uncrosslinked state.

In the dry, uncrosslinked state, films according to the present invention have the following composition on a weight percent basis:

|  | RANGE % | PREFERRED, WT % |
|---|---|---|
| Phenoxy resin | 5-25 | 10-20 |
| Polyurethane | 5-20 | 10-15 |
| Isocyanate | 2-7 | 2.5-6 |
| Organic Portion | 15-50 | 25-40 |
| Decabromophenylene Oxide | 15-60 | 20-55 |
| Antimony trioxide | 10-25 | 15-20 |
| Aluminum oxide trihydrate | 20-40 | 30-35 |
| Flame Retardant | 50-85 | 60-75 |

If aluminum oxide trihydrate is added to the flame retardant portion, the ratio of decabromophenylene oxide/antimony trioxide must be maintained.

Films produced according to the present invention in the uncrosslinked state must be strippable from the release paper and flexible. Film Integrity or flexibility is observed by stripping off the release paper and folding the film. A film with excellent film integrity will be easily stripped from the release paper and will fold over onto itself without cracking or separating. After crosslinking in the embossing process, such films exhibit excellent adhesion to Tedlar and preserve the patterns or texture imparted to the Tedlar in the embossing operation.

In the embossing process the curing adhesive film of the present invention is stripped from the release paper and placed on a heated press between two layers of Tedlar. The embossing press provides conditions of about 100 psi and temperature of approximately 320° F.±10° for about 10 to 20 minutes. At these conditions, the blocked aliphatic isocyanate prepolymers become unblocked and crosslink with the phenoxy and polyurethane components. This film thus adheres to the Tedlar and accepts and holds the patterns imparted by the embossing presses.

Other methods of embossing such a passing the material through the heated embossing rolls, may also be employed. Also, the film may be utilized to form materials having three or more layers of Tedlar.

EXAMPLES

Examples 1 to 4—Prior Art

Film having the compositions listed below, expressed as weight percent of total film on a dry basis, were produced and tested for OSU Heat Release, Smoke Number and Film Integrity. The film of Example 1 was produced by first adding Toluol (215.4 g) and Dowanol PM (215.4 g) to a vessel equipped with a high shear mixer. With the mixer on, aluminum oxide trihydrate (406.7 g) was slowly added and mixed until fully dispersed. Antimony trioxide (162.5 g) was then slowly added and mixed until fully dispersed to form a dispersion of flame retardant agents. The organic portion was formed by adding Toluol (43.2 g) and Dowanol PM (43.2 g) to another vessel equipped with a high shear mixer. Phenoxy PKHJ (99 g) was added and mixed until dissolved. Polyurethane S943-34 (72 g) was added to the vessel and mixed for one hour. Freshly mixed flame retardant dispersion from above (275.1 g) was added to the vessel and mixed until completely dispersed. Blocked aliphatic isocyanate prepolymer LS2800 (20 g) was then added to the vessel and mixed for 30 minutes. This final mixture was coated on release paper and dried in an oven at a temperature less than 200° F. for ten to twenty minutes to drive off the solvents. The thickness was about 0.003" mils. The films of Examples 2 to 4 were produced in the same manner but utilized different amounts of dispersion and organic binder portion.

The OSU Heat Release test was carried out in accordance with the method described in the Federal Register, Vol. 51, No. 139, July 13, 1986, pp. 26, 214 to 26,220. Both the two-minute integrated heat release rate and the peak heat release rate were measured. The Smoke Number was determined by both the OSU and National Bureau of Standards (NBS) methods. Results are provided in units of smoke which are defined as Standard Metric Optical Kinetic Emission. One smoke unit per cubic meter reduces the percent transmission of light through one meter of air to 10% of the incident light, i.e., one smoke unit in one cubic meter of air has an absorbency of 1.0. Film Integrity was tested in both the crosslinked and uncrosslinked states. The results were as follows:

| EXAMPLES 1-4 | | | | |
|---|---|---|---|---|
|  | EXAMPLE | | | |
|  | 1 | 2 | 3 | 4 |
| Composition, Weight % | | | | |
| Phenoxy | 28.5 | 20.7 | 15.5 | 10.4 |
| Polyurethane | 20.8 | 15.1 | 11.4 | 7.6 |
| Blocked isocyanate | 5.7 | 4.2 | 3.1 | 2.0 |
| Organic Binder Portion | 55.0 | 40.0 | 30.0 | 20.0 |
| Antimony Trioxide | 12.8 | 17.1 | 19.9 | 22.7 |
| Aluminum Oxide Trihydrate | 32.2 | 42.9 | 50.1 | 57.3 |
| Flame Retardant Portion | 45.0 | 60.0 | 70.0 | 80.0 |
| PERFORMANCE | | | | |
| OSU Heat Release | | | | |
| Two-Minute | 62.38 | 56.27 | 55.12 | 49.09 |
| Peak | 57.6 | 47.38 | 46.95 | 53.17 |
| Smoke Number | | | | |
| OSU | 50.35 | 48.84 | 38.44 | 37.27 |
| NBS | 25.0 | 20.9 | 24.63 | 23.90 |
| Film Integrity | | | | |
| Uncrosslinked | Very Good | Very Good | Fair | Poor |
| Crosslinked | Very Good | Very Good | Fair | Poor |

In the above table the polyurethane was S943-34 sold by Bostik Industrial Products Division; the phenoxy was PHenoxy PKHJ sold by Union Carbide; and the blocked isocyanate was LS2800 sold by Mobay Chemical Co. The antimony trioxide was Thermoguard S and the aluminum oxide trihydrate was Aluchem AC714K. The ratio of phenoxy to polyurethane was approximately 1.4:1.

EXAMPLE 5—PRIOR ART

A film having the composition listed below was produced and tested as above. In this example the polyurethane was KJ Quinn PA-58. The remaining components were the same as for Examples 1 to 4. The results were as follows:

| Composition, Weight Percent | |
|---|---|
| Phenoxy | 33.4 |
| Polyurethane | 17.0 |
| Blocked isocyanate | 6.6 |

| -continued | |
|---|---|
| Organic Binder Portion | 57.0 |
| Antimony Trioxide | 12.3 |
| Aluminum Oxide Trihydrate | 30.7 |
| Flame Retardant Portion | 43.0 |
| PERFORMANCE | |
| OSU Heat Release | |
| Two-minute | 57.75 |
| Peak | 50.47 |
| Smoke Number | |
| OSU | 53.36 |
| NBS | — |
| Film Integrity | |
| Uncrosslinked | Very good |
| Crosslinked | Very good |

The ratio of phenoxy/polyurethane was approximately 2:1.

EXAMPLES 6-8

Films having the composition listed below were produced and tested as above. In these examples, the polyurethane was S943-34, the phenoxy was Phenoxy PKHJ, the blocked isocyanate was LS2800, the antimony trioxide was Thermoguard S and the decabromophenylene oxide was DE83R. The results were as follows:

TABLE 3

| | EXAMPLE | | |
|---|---|---|---|
| | 6 | 7 | 8 |
| Composition, Weight % | | | |
| Phenoxy | 8.7 | 14.3 | 20.5 |
| Polyurethane | 7.5 | 12.4 | 17.7 |
| Blocked Isocyanate | 2.0 | 3.3 | 4.8 |
| Organic Binder Portion | 18.2 | 30.0 | 43.0 |
| Decabromophenylene Oxide | 61.3 | 52.5 | 42.7 |
| Antimony trioxide | 20.5 | 17.5 | 14.3 |
| Flame Retardant Portion | 81.8 | 70.0 | 57.0 |
| PERFORMANCE | | | |
| OSU Heat Release | | | |
| Two-Minute | 21.93 | 27.13 | 34.26 |
| Peak | 33.43 | 28.51 | 35.70 |
| Smoke Number | | | |
| OSU | 44.18 | 45.97 | 47.18 |
| NBS | 102.17 | 113.47 | 93.20 |
| Film Integrity | | | |
| Uncrosslinked | Very Good | Excel. | Excel. |
| Crosslinked | Very Good | Excel. | Excel. |

The ratio of phenoxy/polyurethane was about 1.2:1 and the ratio of decambromophenylene oxide to antimony trioxide was about 3:1.

EXAMPLE 9

A film having the composition listed below was produced and tested, as above. In this example, the components were the same as those of Examples 6-8 except that the polyurethane was KJ Quinn PA-58.

| | EXAMPLE 9 |
|---|---|
| Composition, Weight % | |
| Phenoxy | 18.3 |
| Polyurethane | 9.3 |
| Blocked Isocyanate | 2.7 |
| Organic Binder Portion | 30.4 |
| Decabromophenylene Oxide | 51.6 |

| | EXAMPLE 9 |
|---|---|
| Antimony Trioxide | 18.0 |
| Flame Retardant Portion | 69.6 |
| PERFORMANCE | |
| OSU Heat Release | |
| Two-Minute | 26.66 |
| Peak | 28.35 |
| Smoke Number | |
| OSU | 47.04 |
| NBS | 113.6 |
| Film Integrity | |
| Uncrosslinked | Very Good |
| Crosslinked | Very Good |

The ratio of phenoxy/polyurethane was about 2:1 and the ratio of decabromophenylene oxide/antimony trioxide was 2.8:1.

EXAMPLES 10-12

Films having the compositions listed below were produced and tested as in Examples 6-8 above. The components were the same as those utilized in Examples 6-8, with the exception that aluminum oxide trihydrate was added to the flame retardant portion. The results were as follows:

| | EXAMPLE | | |
|---|---|---|---|
| | 10 | 11 | 12 |
| Composition, Weight % | | | |
| Phenoxy | 16.8 | 14.4 | 9.6 |
| Polyurethane | 14.2 | 12.2 | 8.1 |
| Blocked Isocyanate | 4.0 | 3.4 | 2.3 |
| Organic Binder Portion | 35.0 | 30.0 | 20.0 |
| Decabromophenylene Oxide | 21.0 | 22.6 | 25.84 |
| Antimony Trioxide | 12.5 | 13.5 | 15.45 |
| Aluminum Oxide Trihydrate | 31.5 | 33.9 | 38.15 |
| Flame Retardant Portion | 65.0 | 70.0 | 80.0 |
| PERFORMANCE | | | |
| OSU Heat Release | | | |
| Two-Minute | 39.98 | 35.92 | 35.87 |
| Peak | 36.84 | 35.11 | 39.6 |
| Smoke Number | | | |
| OSU | 47.34 | 39.37 | 29.91 |
| NBS | 74.03 | 59.07 | 55.87 |
| Film Integrity | | | |
| Uncrosslinked | Excel. | Excel. | Fair |
| Crosslinked | Excel. | Excel. | Good |

The phenoxy/polyurethane ratio for the above examples was about 1.2:1 and the decabromophenylene oxide/antimony trioxide ratio was about 1.7:1.

Referring to the examples, the unexpected OSU Heat Release properties exhibited by the decabromophenylene oxide containing films of the present invention is observed. At the 80 weight percent level of the flame retardant, example 4, containing antimony trioxide and aluminum trihydrate, should be compared with examples 6 and 12, containing decabromophenylene oxide. The films of examples 6 and 12 exhibit unexpectedly superior OSU Heat Release and Film Integrity properties. At the 70% flame retardant level, example 3 should be compared with examples 7, 9 and 11. Again, the decabromophenylene oxide containing films exhibit unexpectedly superior OSU Heat Release properties.

We claim:

1. A curing adhesive film which comprises:

(a) an organic binder portion comprising a hydroxyl terminated polyurethane elastomer, a phenoxy resin, and a blocked aliphatic isocyanate prepolyer wherein the phenoxy and polyurethane are employed in a phenoxy to polyurethane weight ratio of about 1:3 to about 2:1; and (b) from about 50 to about 85% by weight of the total film composition of a fire retardant agent comprising:

decabromophenylene oxide and antimony trioxide in a ratio of from about 3:2 to about 1:2 wherein said film has a total OSU heat release of from about 20 to about 40, adheres to polyvinylfluoride film, and is capable of preserving a pattern imparted to the polyvinylfluoride film in an embossing operation.

2. The film according to claim 1 wherein the polyurethane has a hydroxyl number of from 1 to about 8 KOH/g.

3. The film according to claim 2 wherein the polyurethane is a reaction product of butuane diol adipate, hexane diol adipate or polycaprolactone chain extended with methylene bis diphenyl diisocyanate (MDI) or butane diol.

4. The film according to claim 1 wherein the phenoxy resins are Phenoxy PKHA, PKHH or PKHJ.

5. The film according to claim 1 wherein the blocked isocyanate is ketoxime blocked hexane diisocyanate trimer.

6. The film according to claim 1 wherein the phenoxy/polyurethane ratio is about 1.5:1 to about 2:1.

7. The film according to claim 1 wherein the decabromophenylene oxide and antimony trioxide are employed in a ratio of about 3:1.

8. The film according to claim 1 wherein the decabromophenylene oxide and antimony trioxide are employed with an average particle size of less than approximately 10 microns.

9. The film according to claim 1 wherein the film also includes aluminum oxide trihydrate as a flame retardant agent.

10. The film according to claim 1 wherein the flame retardant agent comprises from about 60 to 75 percent by weight of the total composition.

11. The film according to claim 1 wherein the peak OSU heat release is from about 25 to 40.

12. A curing adhesive film which comprises:

from about 5 to about 25 weight percent, based upon the total film composition, of a phenoxy resin;

from about 5 to 20 weight percent hydroxyl terminated polyurethane elastomer;

from about 2 to about 7 weight percent blocked aliphatic isocyanate prepolymer;

from about 15 to 60 weight percent decabromophenylene oxide;

from about 10 to about 25 weight percent antimony trioxide; and from about 20 to about 40 weight percent aluminum oxide trihydrate.

13. A film according to claim 1 which is produced by:

forming a dispersion of flame retardant agent in a volatile solvent;

forming a solution of phenoxy and polurethane organic components in a volatile solvent;

combining the flame retardant dispersion and organic component solution; adding blocked isocyanate;

coating on release paper and heating to drive off the volatile solvents at a temperature and time such that the isocyanate will not be unblocked.

* * * * *